Oct. 23, 1962  J. D. BALL ET AL  3,060,388
D.C. SIGNAL TO PULSE RATE CONVERTER
Filed Nov. 27, 1959
FIG. 3.
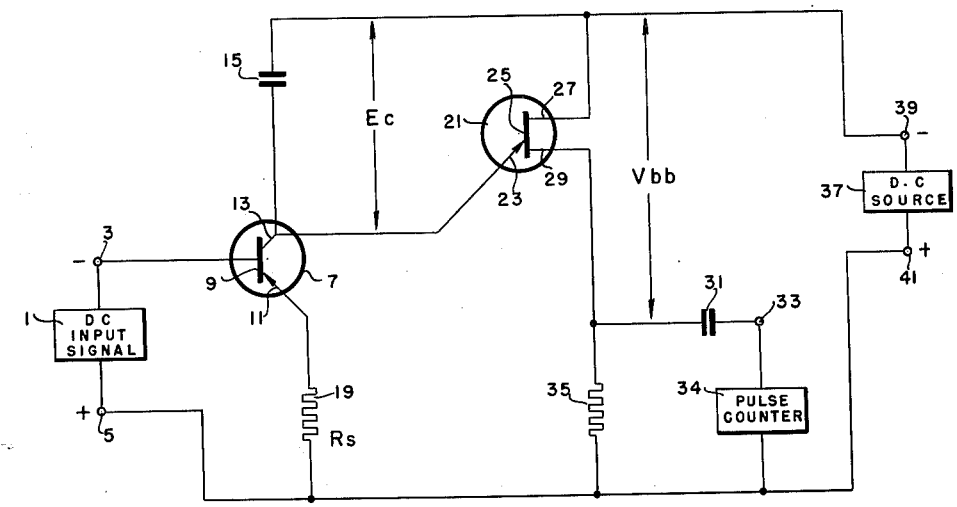
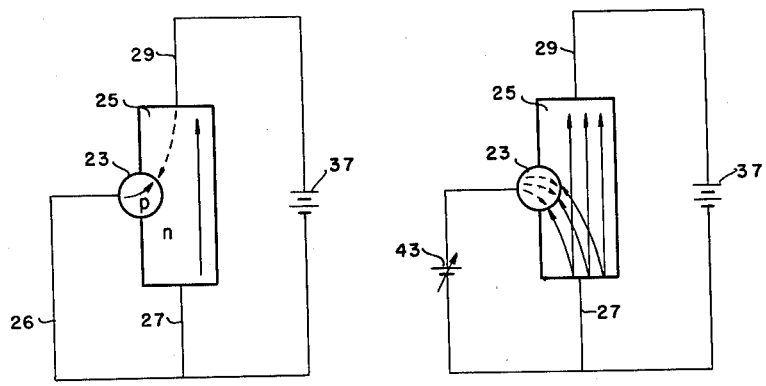
FIG. 1.   FIG. 2.
INVENTORS.
JOHN D. BALL,
PRESTON S. PHILLIPS,
BY John B. Davidson
ATTORNEY.

United States Patent Office 3,060,388
Patented Oct. 23, 1962

3,060,388
D.C. SIGNAL TO PULSE RATE CONVERTER
John D. Ball, Houston, Tex., and Preston S. Phillips, Maracaibo, Venezuela; said Ball, assignor, by mesne assignments, to Jersey Production Research Company, Tulsa, Okla., a corporation of Delaware
Filed Nov. 27, 1959, Ser. No. 855,602
3 Claims. (Cl. 332—9)

The present invention is directed to apparatus for converting a D.C. voltage into a pulse train having a repetition rate functionally related to the magnitude of the voltage.

Certain types of gas flow or liquid flow measuring devices produce an output signal that is in the form of a D.C. voltage which is proportional to the flow rate to be measured. In order to measure the total fluid flow over any given length of time, the output voltage of the flow measuring device must be integrated with respect to time. Since the period of integration can be 24 hours or more, the problems associated with integration of a D.C. voltage make it difficult to design a system capable of high accuracy. Furthermore, the output signal of the integrator would be in the form of a D.C. voltage and would not be particularly suitable as the input signal to a remote readout system.

The above objections may be overcome by converting the D.C. voltage representing rate of fluid flow into a pulse train having a repetition rate functionally related to and preferably proportional to the D.C. voltage. The pulse train may then be fed to a conventional electronic counter for counting the pulses coupled thereto. The count indicated by the electronic counter over any desired readout time will be directly proportional to total fluid flow over the time interval between readouts.

An object of the present invention is to provide an accurate, reliable, and inexpensive apparatus for producing a pulse train having a repetition rate functionally related to the magnitude of a unipotential voltage.

Other objects and features of the invention will become apparent upon consideration of the following description thereof when considered in connection with the accompanying drawings, wherein:

FIGS. 1 and 2 are elementary schematic diagrams illustrating the operation of the semiconductive device known as a unipotential transistor or double base diode, and FIG. 3 is a schematic diagram illlustrating an embodiment of the invention.

The invention makes use of semiconductor means, preferably a unijunction transistor, having the characteristic of changing from a substantially non-conductive state to a highly conductive state when a given voltage is applied to an input or control circuit thereof. The operation of a unijunction transistor is illustrated in FIGS. 1 and 2. The unijunction transistor comprises a semiconductive bar or base 25 of one conductivity type and a small zone, or emitter, 23 of the opposite conductivity type that form a p-n junction. A pair of connectors 27 and 29 are in ohmic contact with base 25 at spaced-apart locations so that an electrical voltage gradient is produced through the base 25 when a D.C. source 37 is connected thereto. The p-n junction formed by the zone 23 and base 25 should comprise a small portion of the distance between the electrical connectors 27 and 29.

Consider now the situation that exists when the electrical connector 27 is directly connected to zone 23 by electrical lead 26. There will be a very small electron flow from connector 27 to connector 29 that is indicated by the solid line arrow in base 25. With zone 23 connected to connector 27, the p-n junction is reverse-biased. The only current flowing in the electrical lead 26 is a reverse bias current. This latter current is produced by electron flow from electrical lead 26 to the p-n junction indicated by the solid line arrow in zone 23, and flow of holes from connector 29 to the p-n junction indicated by the dotted line arrows in base 25.

Assume now that an adjustable bias source 43 is connected between zone 23 and connector 27. If the voltage of source 43 is increased from substantially zero so that the voltage in base 25 opposite zone 23 is greater than the voltage applied to zone 23 by source 43, the condition shown in FIG. 1 prevails. When the voltage applied to zone 23 becomes greater than the voltage opposite zone 23, the p-n junction becomes forward-biased. Heavy election flow is produced in base 25 between connector 27 and the p-n junction, and heavy hole current flow, indicated by the dotted line arrows, occurs in zone 23. Additionally, a very heavy electron flow is produced between connectors 27 and 29 through base 25. This latter electron flow is many times the magnitude of the flow that occurs when the p-n junction is reverse-biased, and the increase occurs almost instantly after the p-n junction becomes forward-biased.

In accordance with one aspect of the present invention, a capacitor means is connected in circuit relationship with a semiconductive device such as a unijunction transistor so as to control the magnitude of current flow through an output circuit of the semi-conductive device. A constant-current control valve, such as a junction transistor, is connected to the capacitor to control the rate at which the capacitor is charged from a D.C. source. The D.C. voltage to be converted into a pulse train varies the magnitude of current flow through the junction transistor and therefore varies the charging rate of the capacitor. When the voltage across the capacitor becomes sufficiently large to trigger current flow in the output circuit of the semiconductive device as described above, a sharp pulse of current is produced in the output circuit of the semiconductive device and the capacitor is discharged. By producing an output voltage from the sharp pulse of current, and controlling the rate at which the capacitor is charged, output pulses can be produced at a rate which is substantially proportional to the magnitude of the control voltage.

With reference now to the apparatus shown in FIG. 3, reference numerals 7 and 21, respectively, designate a conventional junction transistor and a unijunction transistor. The collector electrode 13 of junction transistor 7 is connected to the zone 23 of the unijunction transistor 21. The zone 23 is the same as the zone of p-type semiconductive material illustrated in FIGS. 1 and 2. The base 25 and connectors 27 and 29 shown in FIG. 3 similarly correspond to elements in FIGS. 1 and 2 having the same reference numerals.

A capacitor 15 is connected between connector 27 and zone 23. This capacitor may have a capacitance between 1 and 100 μfd. for use in connection with fluid flow rate measurement. A direct current source 37, which should be regulated so as to produce a substantially unvarying output voltage, supplies bias voltage for the apparatus. Negative output terminal 39 of source 37 is directly connected to connector 27, and positive output terminal 41 is connected to connector 29 through output impedance 35, which may be a resistor.

Junction resistor 7 has an emitter 11, a base electrode 9, and a collector electrode 13. The D.C. source terminal 41 is connected to emitter 11 through resistor 19 so that the capacitor 15 is charged through transistor 7. The resistance of resistor 19 should be at least 10 times the base input resistance of transistor 7. The direct current input signal is derived from a source 1, which may be a known type of fluid flow measuring device having an output signal in the form of a direct current voltage proportional to the flow rate being measured. Output terminals 3 and 5 of device 1 respectively are connected to base electrode 9 and resistor 19.

The output signal from the system is produced across output impedance member 35. Output terminal 33 is electrically coupled to impedance member 35 by means of coupling capacitor 31. A pulse counter 34 may be connected between terminal 33 and terminal 41 to measure the output pulses produced across impedance member 35.

The operation of the device illustrated in FIG. 3 is as follows. The output signal of device 1 will control the magnitude of the current flowing through transistor 7. The current flowing through the transistor 7 will stay substantially constant with variations in the voltage applied between emitter 11 and collector 13, and will vary only with variations in the output voltage of device 1. Therefore, capacitor 15 will charge at a substantially constant rate when the output voltage of device 1 is constant. When the voltage applied between unijunction transistor zone 23 and connector 27 is such that the p–n junction is forward-biased, the heavy current flow produced as described above will discharge capacitor 15 and produce a sharp voltage pulse across impedance member 35. The capictor will again begin the charging cycle and will again be discharged as described above. Manifestly, the charging current through transistor 7 will increase as the output voltage of device 1 increases, and the repetition rate of the pulse train appearing across impedance member 35 will vary accordingly.

It can be shown that the charging current flowing through the emitter-collector conductive path of junction transistor 7 is given by the formula:

$$i_c = \frac{e_{in}}{r_b + (1+\beta)R_s}$$

$e_{in}$ = input voltage
$\beta$ = current gain of transistor
$r_b$ = base input resistance
$R_s$ = emitter series resistance (resistor 19)

If $(1+\beta)R_s \gg r_b$ and $\beta \gg 1$ then the collector current $i_c$ of transistor 7 is given by the following approximation:

$$i_c \approx \frac{e_{in}}{R_s}$$

This approximation is better than 0.1% accurate for a good junction transistor if $R_s \gg r_b$ for all temperature ranges.

The voltage across the capacitor 15 is given by the relationship:

$$E_c = \frac{1}{C_1}\int i_c dt = \frac{1}{C_1}\int \frac{e_{in}}{R_s}dt$$

where $e_{in}$ and $R_s$ are constants and $C_1$ is the capacity of capacitor 15 therefore $$E_c = \frac{(e_{in})(t)}{C_1 R_s} \text{ volt seconds}$$

The trigger voltage for the unijunction transistor is given by the relationship:

$$V_p = \eta V_{bb} + \frac{200}{T}$$

where $\eta$ = a constant of the unijunction transistor
$V_{bb}$ = voltage between connectors 27 and 29
$T$ = temperature of junction in absolute degrees The value of $\eta$ is from 0.5 to 0.7 depending upon the unijunction transistor used. It can be seen that the value of $V_{bb}$ can be chosen so that the voltage $E_c$ required to trigger the unijunction transistor varies less than 0.2% over the temperature range from 0° to 75° C. It also can be seen that the repetition rate of the signal appearing across impedance member 35 will vary as a substantially linear function of the D.C. input voltage applied to terminals 3, 5.

The following typical values of circuit constants were found to be effective in the embodiment of the invention illustrated in FIG. 3:

| | |
|---|---|
| Transistor 7 | Type 2N369. |
| Transistor 21 | Type 2N492. |
| Capacitor 15 | 10 μfd. |
| Resistor 19 | 10,000 ohms. |
| Resistor 35 | 100 ohms. |
| Capacitor 31 | .001 μfd. |
| D.C. source 37 | 20–30 volts. |

The invention is not to be restricted to the specific structural details, arrangement of parts, or circuit connections herein set forth, as various modifications thereof may be effected without departing from the spirit and scope of the invention.

What is claimed is:

1. Apparatus for deriving a pulse train having a repetition rate controlled by a direct current control voltage comprising: a unijunction transistor including a semiconductor base member of one conductivity type, first and second electrical connectors connected to said base member at spaced-apart locations thereon, and a zone of semiconductive material of the opposite conductivity type forming a p-n junction with said base member between said electrical connectors positioned so that the electrical gradient in the base member opposite the p-n junction resulting from imposition of a voltage across said connectors is a small portion of the total voltage between the electrical terminals; a direct current source; first impedance means connecting the direct current source between the electrical connectors; junction transistor means having emitter, base, and collector electrodes; second impedance means connecting one terminal of the direct current source to the emitter electrode; capacitor means connecting the other terminal of the direct current source to the collector electrode; means directly connecting the collector electrode to said zone of semiconductive material, and input terminal means connected to said base electrode and to said second impedance means adapted to receive said direct current control voltage to vary the conductivity of said transistor means in accordance with variations in the control voltage, the output pulses being derived from across the first impedance means.

2. Apparatus for deriving a pulse train having a repetition rate controlled by a direct current control voltage comprising: a unijunction transistor including a semiconductive base member of one conductivity type, first and second electrical connectors in ohmic contact with said base member at spaced-apart locations thereon, and a zone of semiconductive material of the opposite conductivity type forming a p-n junction with said base member between said electrical connectors positioned so that the electrical gradient in the base member opposite the p-n junction resulting from imposition of a voltage across said connectors is a small portion of the total voltage between the electrical terminals; a direct current source having a pair of output terminals; first resistor means connecting the direct current source between the electrical connectors; junction transistor means having emitter, base, and collector electrodes; second resistor means connecting one terminal of the direct current source to the emitter electrode; said second resistor means having a resistance at least ten times the base-emitter resistance of said junction transistor means; capacitor means connecting the other terminal of the direct current source to the collector electrode; means directly connecting the collector electrode to said zone of semiconductive material, and input terminal means connected to said base electrode and to said second resistor means adapted to receive said direct current control voltage to vary the conductivity of said transistor means in accordance with variations in the control voltage, the output pulses being derived from across the first resistor means.

3. Apparatus for deriving a pulse train having a repetition rate controlled by a direct current control voltage comprising: input terminal means for receiving said control voltage; a unijunction transistor including a semiconductive base member of one conductivity type, first and second electrical connectors in ohmic contact with said base member at spaced-apart locations thereon, and a zone of semiconductive material of the opposite conductivity type forming a p-n junction with said base member between said electrical connectors positioned so that the electrical gradient in the base member opposite the p-n junction resulting from imposition of a voltage across said connectors is a small portion of the total voltage between the electrical terminals; a capacitor coupled between said first connector and said zone of semiconductive material; a direct current source; output impedance means coupling said direct current source between said first and second terminals; control voltage terminal means; and constant current valve means connected to said zone of semiconducting material, connecting said capacitor to said direct current source, and coupled to said input terminal means adapted to charge said capacitor at a time rate variable as a function of said control voltage.

References Cited in the file of this patent

UNITED STATES PATENTS

| | | |
|---|---|---|
| 2,663,800 | Herzog | Dec. 22, 1953 |
| 2,826,696 | Suran | Mar. 11, 1958 |
| 2,879,482 | Mathis et al. | Mar. 24, 1959 |
| 2,930,996 | Chow et al. | Mar. 29, 1960 |
| 2,968,770 | Sylvan | Jan. 17, 1961 |

OTHER REFERENCES

"Principles of Transistor Circuits," by Shea, p. 164; John Wiley and Sons Inc., 1953.